United States Patent
Yamashita et al.

(10) Patent No.: US 6,340,870 B1
(45) Date of Patent: Jan. 22, 2002

(54) LIGHTING CIRCUIT FOR DISCHARGE LAMP

(75) Inventors: Masayasu Yamashita; Jun Yabuzaki, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/526,884

(22) Filed: Mar. 16, 2000

(30) Foreign Application Priority Data

Mar. 17, 1999 (JP) .......................................... 11-071853

(51) Int. Cl.[7] .............................................. H05B 37/02
(52) U.S. Cl. ........................ 315/308; 315/224; 315/225
(58) Field of Search ................................ 315/307, 224, 315/225, 247, 291, 209 R, 219, 362, 308, 360, 127, 309

(56) References Cited

U.S. PATENT DOCUMENTS

| 5,142,203 A | | 8/1992 | Oda et al. .................... 315/308 |
| 5,365,152 A | * | 11/1994 | Ozawa et al. ................ 315/291 |
| 5,434,474 A | * | 7/1995 | Ukita et al. .................. 315/308 |
| 5,449,973 A | | 9/1995 | Yamashita et al. ............. 315/82 |
| 5,463,287 A | * | 10/1995 | Kurihara et al. ............. 315/308 |
| 5,706,185 A | * | 1/1998 | Toyama et al. .............. 315/127 |
| 5,907,224 A | * | 5/1999 | Yamashita et al. ........... 315/308 |

FOREIGN PATENT DOCUMENTS

JP 4-141988 5/1992 ........... H05B/41/24

\* cited by examiner

*Primary Examiner*—Don Wong
*Assistant Examiner*—Wilson Lee
(74) *Attorney, Agent, or Firm*—Sughrue Mion, PLLC

(57) ABSTRACT

A lighting circuit for a discharge lamp incorporates a DC-DC converter for converting DC voltage and a control circuit for controlling the output voltage from the converter by controlling the ON/OFF operation of an FET which is configured as the converter. The electric current which flows in the FET is monitored by detecting the voltage between the drain and the source to turn the field effect transistor off when the voltage level is at the reference value or higher. Thus, a pulse-by-pulse current limitation is performed. Limitation of an electric current in a switching device in a DC-DC converter of a lighting circuit for a discharge lamp is achieved while reducing the size and cost of the circuit apparatus.

8 Claims, 8 Drawing Sheets

LIGHTING CIRCUIT FOR DISCHARGE LAMP

FIELD OF THE INVENTION

The present invention relates to a circuit for preventing rupture of a device caused by overcurrent, in a lighting circuit for a discharge lamp incorporating a DC-DC converter. The circuit limits an electric current of a switching device of the converter.

BACKGROUND OF THE INVENTION

A lighting circuit for a discharge lamp, such as a metal halide lamp, is known which incorporates a DC power source, a switching power source circuit, a DC-AC converting circuit and a start circuit. The switching power source circuit configured as a DC-DC converter circuit is controlled by, for example, a known PWM (Pulse Width Modulation) method.

The conventional method is arranged to control change in the ON/OFF ratio or the duty ratio (the duty cycle) with respect to a semiconductor switching device constituting the converter circuit so that change in the output voltage is permitted. As a reliable countermeasure to prevent rupture because of overcurrent in the switching device in the converter circuit, a so-called pulse-by-pulse current limiting method is known.

FIG. 11 shows an essential portion of an example 71 of a circuit structure incorporating a DC power source 72, a capacitor 73, a transformer T (only a primary winding 74 is illustrated), a FET (Field Effect (type) Transistor) 75 serving as a switching device, and a current detecting resistor 76. That is, the capacitor 73 is disposed in parallel with the DC power source 72. An end of the primary winding 74 of the transformer T is connected to the positive terminal of the DC power source 72. Another end of the transformer T is connected to the drain of the FET 75. The source of the FET 75 is connected to a negative terminal of the DC power source 72 through the current detecting resistor 76. The gate of the FET 75 is supplied with a control signal from a control circuit (for example, a circuit incorporating a PWM control IC)(not shown). In response to the signal, the ON/OFF operation of the FET 75 is controlled.

FIG. 12 schematically shows waveforms of electric current "I" which flows in the FET 75 and a control signal "SD" for the FET (period "Ton" indicates ON-period of the device and "Toff" indicates OFF-period of the device). The voltage of the current I is converted and detected by the current detecting resistor 76 (that is, when the resistance value of the current detecting resistor 76 is "R", detected voltage value is "I•R"). The detection signal is transmitted to the control circuit.

The level "Vlim" indicated with a dashed line shown in FIG. 12 indicates a level (an upper limit) to which the electric current is limited. When the current I reaches this level, the FET is brought to the OFF-state. That is, as the level Vlim is set to a higher level, the length of the OFF-period Toff is shortened. When the level Vlim is set to a lower level, the length of the OFF-period is elongated. As a result of this control, the current value is limited to prevent flow of overcurrent in the switching device (FET). As a result, heating and rupture of the device are prevented.

The circuit having the foregoing current limiting function, however, requires the current detecting resistor 76 to have a relatively large capacitance (for example, a resistor device of a several-W class). Thus, there arises a problem in that a reduction in size and cost of the apparatus cannot be achieved. A similar problem arises when a current transformer for current/voltage converting is employed without use of the current detecting resistor 76.

SUMMARY OF THE INVENTION

Accordingly, an object of the present invention is to easily realize current limitation of a switching device, in a DC-DC converter of a lighting circuit for a discharge lamp, and to reduce the size and cost of the associated circuit apparatus.

According to the present invention, there is provided a lighting circuit for a discharge lamp comprising: a DC-DC converter for converting DC voltage; and, a control circuit for controlling output voltage from the converter by controlling ON/OFF of a field effect transistor that serves as a switching device in the converter, wherein an electric current which flows in the field effect transistor is monitored by detecting a voltage between a drain and a source of the transistor, the control circuit turning the field effect transistor off when the voltage value is not smaller than a reference value.

The present invention has a structure that provides for monitoring the electric current which flows in the field effect transistor by detecting voltage between the drain and the source. When the voltage value is not smaller than a reference value, the field effect transistor is turned off to limit the ON-period. Thus, rupture of the device because of overcurrent can be prevented. Moreover, a current detecting resistor or the like having a large capacitance, for detecting the electric current w flows in the field effect transistor, is not required.

BRIEF DESCRIPTION OF THE DRAWINGS

FIG. 2 shows an example of the structure of a DC-DC converter, in which

FIG. 3 shows an example of a structure incorporation a thermistor which performs a temperature compensation; FIG. 4 shows an example of a structure incorporating a diode for performing temperature compensation.

PREFERRED EMBODIMENTS OF THE INVENTION

Figure 1:
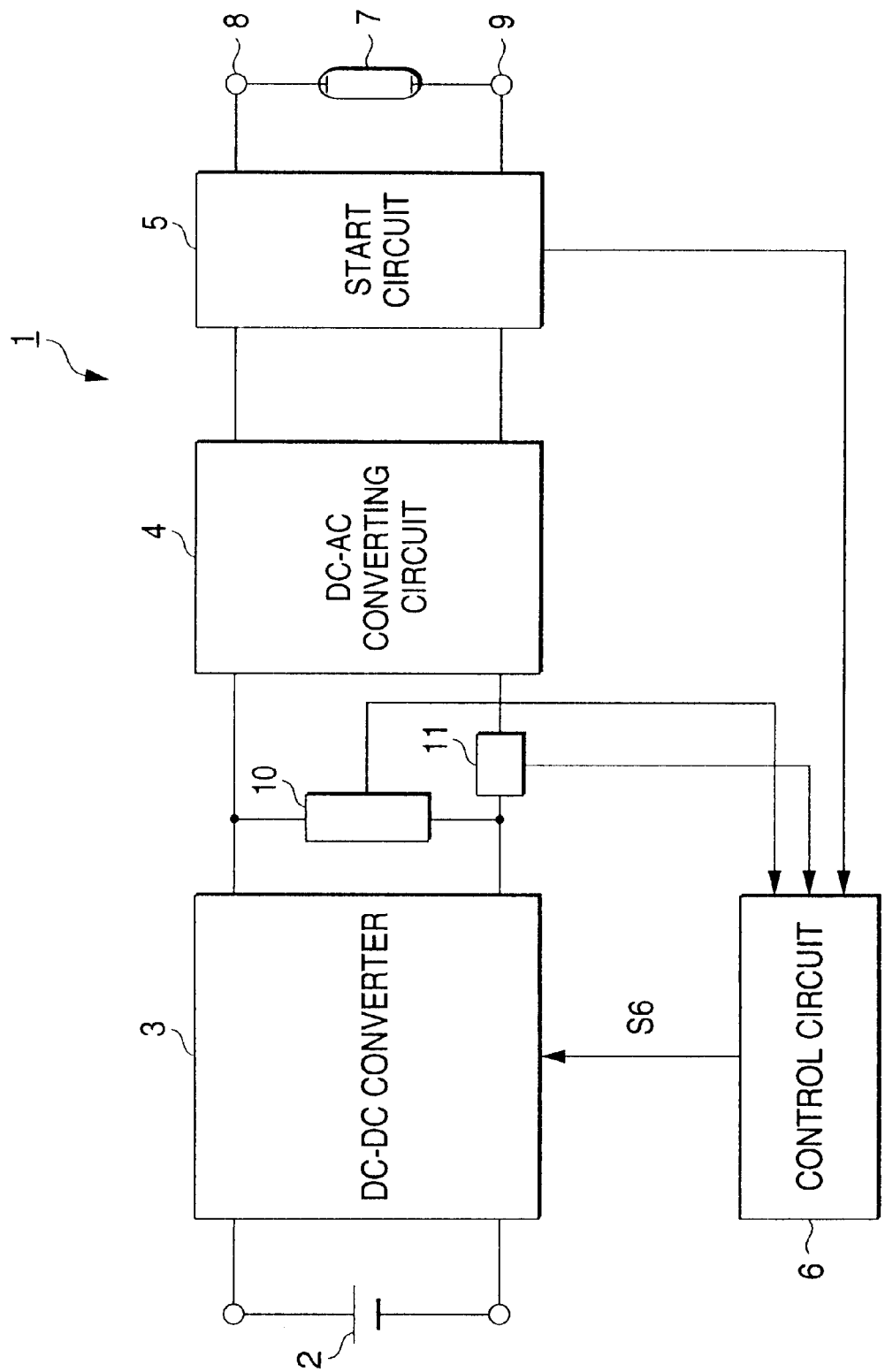
FIG. 1 is a block diagram of a circuit showing the basic structure of the present invention .

FIG. 1 shows the basic structure of the present invention. A lighting circuit 1 for a discharge lamp incorporates a DC power source 2, a direct current (DC)-direct current (DC) converter 3 configured as a switching power source portion, a DC-AC converting portion 4, a start circuit 5, and a control circuit 6. The switching operation of a field effect transistor-disposed in the DC-DC converter 3 is controlled such that the length of the ON-period is limited to limit the electric current which flows in the transistor. Although the lighting circuit 1 for the discharge lamp may be used with a discharge lamp for a vehicle, such as a small-size metal halide lamp, the present invention may be widely applied.

Figure 2A:
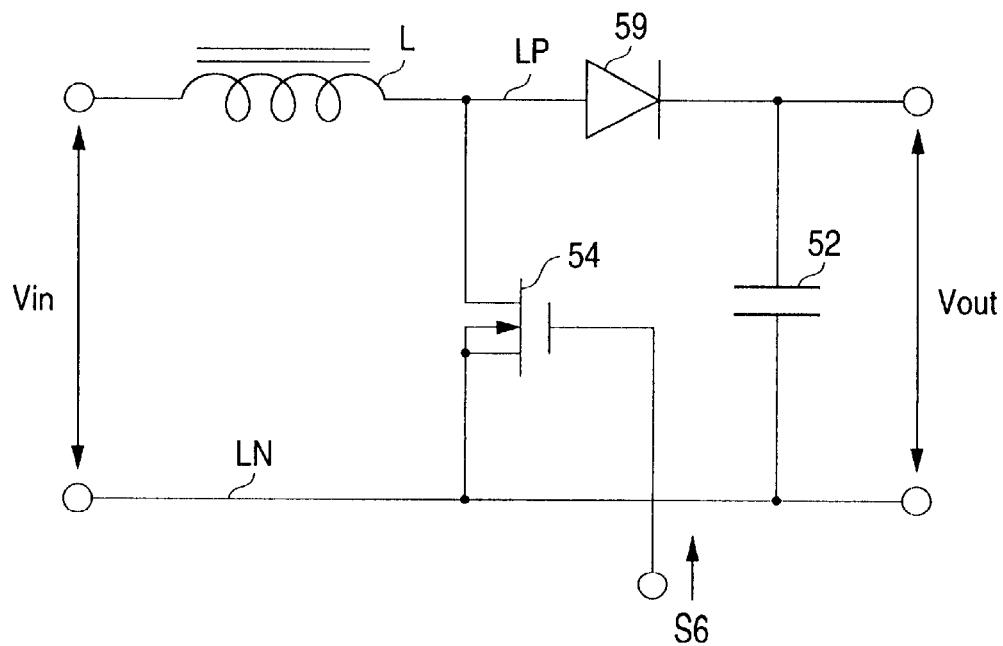
FIG. 2A shows a structure having an inductor L and FIG. 2B shows a structure having a transformer T.
Figure 2B:
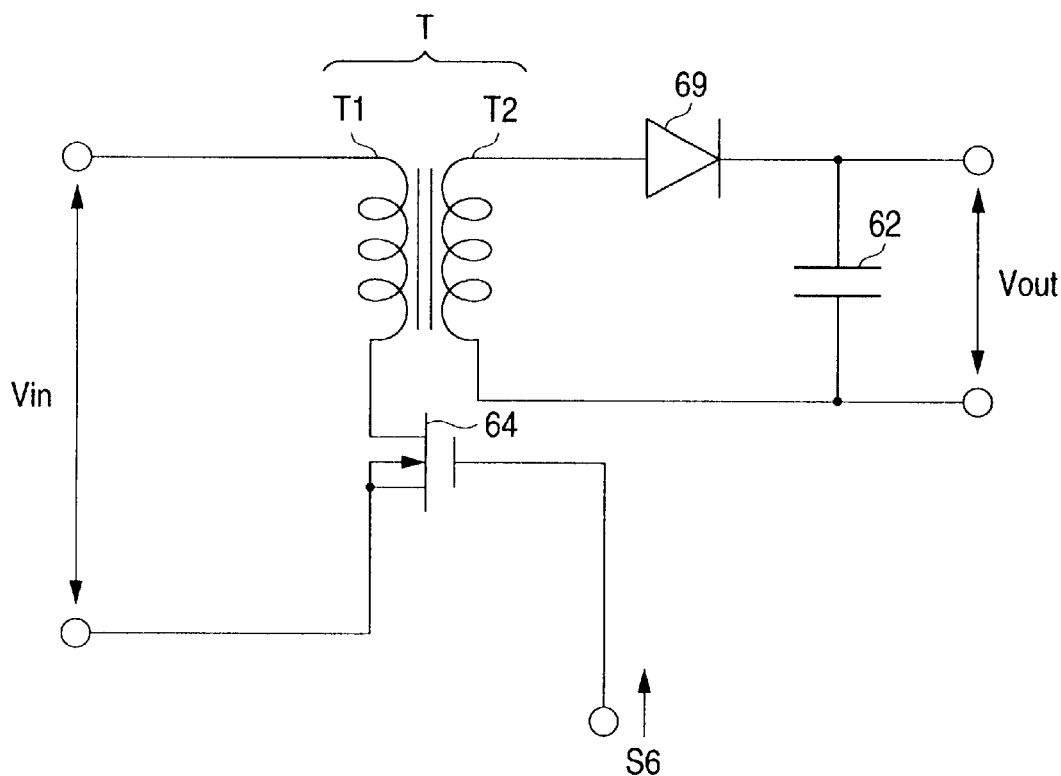

The structure of the DC-DC converter 3 is exemplified by a circuit schematically shown in FIG. 2A and having an inductor L, a FET (field effect transistor) serving as a switching device 54, a diode 59, and a capacitor 52. The circuit is powered by an input voltage "Vin" supplied from a DC power source 2. Another exemplary circuit for a DC-DC converter 3 is schematically shown in FIG. 2B and has a transformer T and a switching device 64 (FET) disposed across the input voltage "Vin" from the DC power source 2. A diode 69 and capacitor 62 are disposed on the secondary side of the transformer T.

That is, the example shown in FIG. 2A has an inductor L and diode 59 disposed on a positive line LP which connects the DC power input terminal and the output terminal. The drain of the N-channel FET "SWITCH" 54 is connected in between the inductor L and (the anode of) the diode 59. The source of the FET is connected to a negative line LN (or a ground line). The terminal voltage of the capacitor 52, disposed in the output stage, is extracted as output voltage "Vout".

The example shown in FIG. 2B has an N-channel FET connected to the primary winding T1 of the transformer T. The diode 69 and the capacitor 62 are disposed on the secondary side of the transformer T. The terminal voltage of the capacitor 62 is extracted as the output voltage "Vout".

In either case, a control signal ("S6") is supplied to the switching device 54. 64 from the control circuit 6 so that the switching, operation of the device is controlled (a control voltage is supplied to the gate of the FET that determines the ON/OFF state of the FET). Thus, the variation of the value of the output voltage Vout is controlled.

Figure 3:
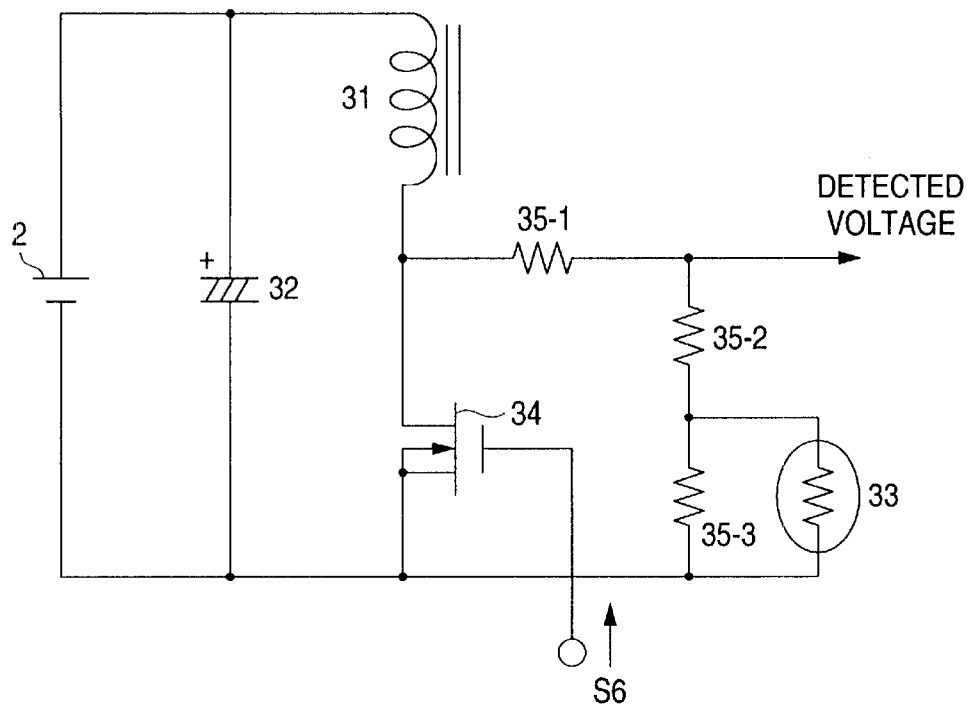
FIGS. 3 and 4 show embodiments of circuits for detecting the voltage between the drain and the source in order to detect an electric current which flows in a FET.
Figure 4:
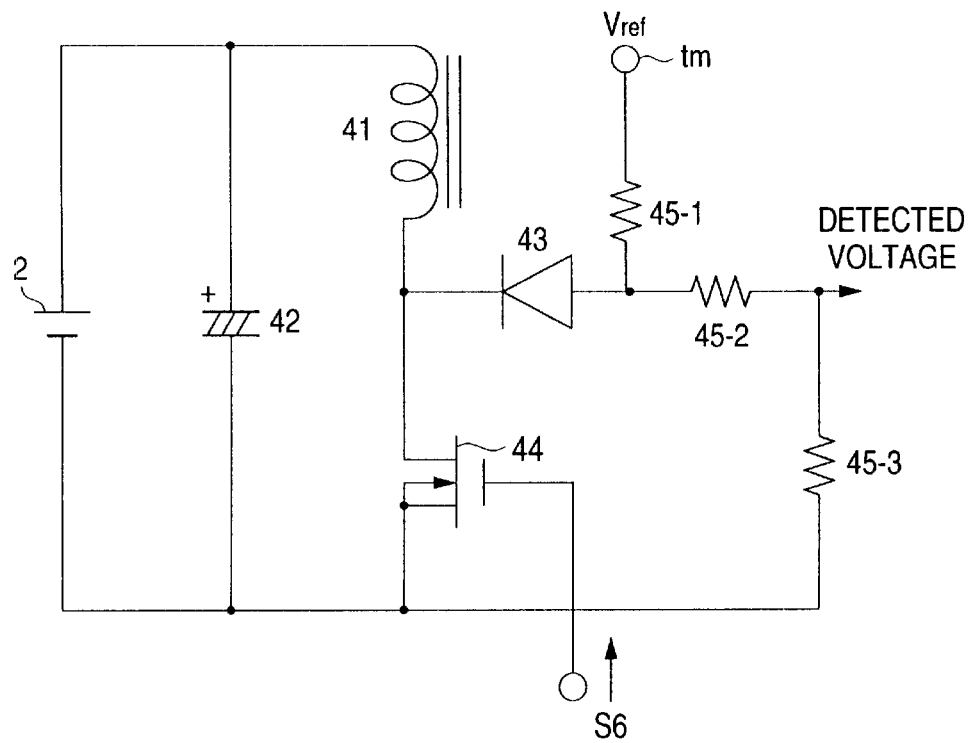

FIGS. 3 and 4 show basic circuits for detecting an electric current which flows in a FET), the circuits adding temperature compensation. Temperature compensation. for coping with the temperature characteristic of the ON-resistance ("RON") of the FET, is addressed by using a thermistor in the structure shown in FIG. 3 and by using a diode in the structure shown in FIG. 4.

Referring to FIG. 3, a capacitor 32 is disposed in parallel with the DC power source 2. A coil 31 (the primary winding and the inductor) and a series circuit incorporating an N-channel FET 34 are disposed in parallel with the capacitor 32.

Regarding detection of the electric current which flows in the FET 34, monitoring is performed by detecting the voltage between the drain and the source of the FET 34 by using a circuit incorporating resistors 35-1 to 35-3 and a thermistor 33. The detected voltage level is communicated to the control circuit 6. The control circuit 6 turns the FET 34 off when the voltage level is not lower than a predetermined value (a reference value, the upper limit of which is fixed), to limit the electric current on a pulse-by-pulse basis.

The necessity for limiting the electric current will now be described. When, for example, a DC main power source (e.g., a battery) for a vehicle is used, there is a possibility that an excessively large electric current will flow in the switching device because of a delay in control of the main power source voltage if the voltage is rapidly changing because of exertion of another load, such as for cranking when the engine is started. In addition, an excessively large electric current may flow in the switching device because of a delay in the main voltage control when the load has rapidly been changed at the instant when the discharge lamp has been turned on. Limitation of the electric current is an effective method of addressing these concerns.

In the structure shown in FIG. 3, the resistor 35-2 and the resistor 35-3 are connected in series. An end of the resistor 35-2 is connected to the drain of the FET 34 through the resistor 35-1. An end of the resistor 35-3 not connected to resistor 35-2 is connected to the source of the FET 34. By this configuration. the voltage between the drain and the source of the FET 34 is used as a substitute for a current detection signal. The voltage adjusted by the circuit having the resistors 35-2 and 35-3 and the thermistor 33 is communicated to the control circuit 6 as a detected voltage. As described above, the detecting portion can be configured as a relatively small number of elements. Moreover, an advantage can be realized in that a resistor device having a large capacitance is not required.

The voltage between the drain and the source is determined by the product $(R_{ON} \cdot I_D)$ of the value of the ON-resistance $R_{ON}$ and the drain current $(I_D)$ in a state where the FET 34 is turned on. Therefore, the accuracy of the result of the detection of the electric current is affected due to a variation in the value of $R_{ON}$ of the device or due to a change in the value of $R_{ON}$ caused from the gate voltage or the current $I_D$. Since an object of the present invention is to prevent rupture of the FET device, an allowance is provided for the detection margin in order to tolerate these variations.

The thermistor 33, serving as a temperature compensation device, is connected in parallel with the resistor 35-3. This arrangement cancels the influence of a change in temperature on the voltage between the drain and the source. In general, the temperature characteristic of $R_{ON}$ is such that the resistance value is doubled in a high temperature region, as compared with a resistance at room temperature. The resistance value may be halved in a low temperature region. Therefore, a change in temperature must be compensated-for in order to prevent an error in the current limitation .

Figure 5:
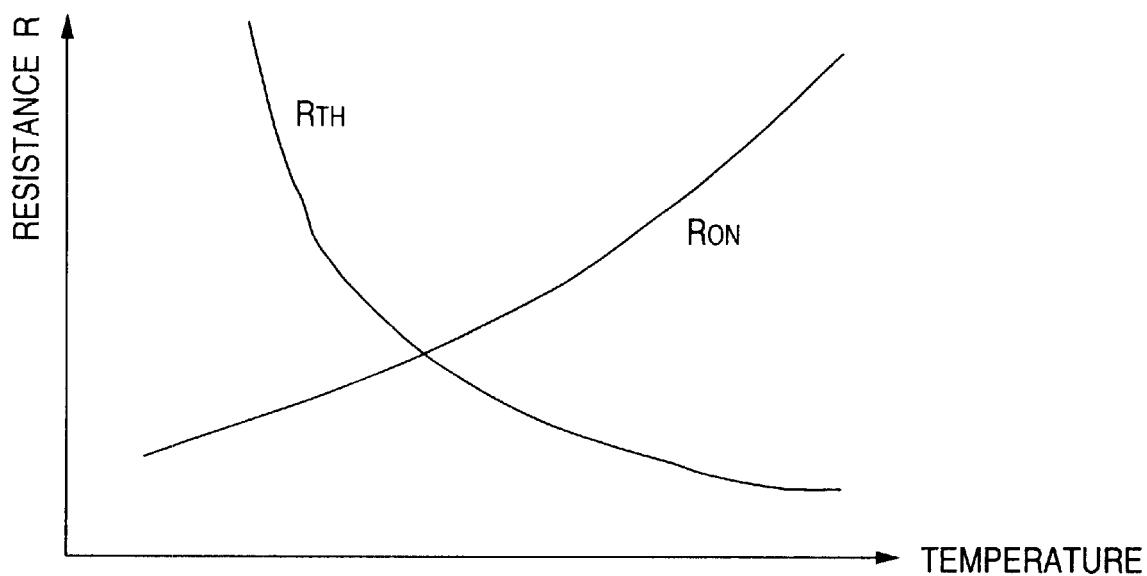
FIG. 5 is a graph schematically showing the temperature characteristic of the ON-resistance of a FET compared with that for the resistance of a thermistor.

FIG. 5 is a graph having the axis of abscissa representing temperature Temp and the ordinate axis representing resistance values R, illustrating the temperature characteristic of the ON resistance $R_{ON}$ of the FET and the temperature characteristic of the resistance value $R_{TH}$ of the thermistor 33.

The ON resistance $R_{ON}$ increases as the temperature Temp is raised. On the other hand, the resistance value $R_{TH}$ of the thermistor decreases as the temperature Temp is raised. Therefore, the increase of the ON resistance $R_{ON}$ caused from a rise in temperature can be canceled by the corresponding decrease in resistance of thermistor 33.

Figure 6:
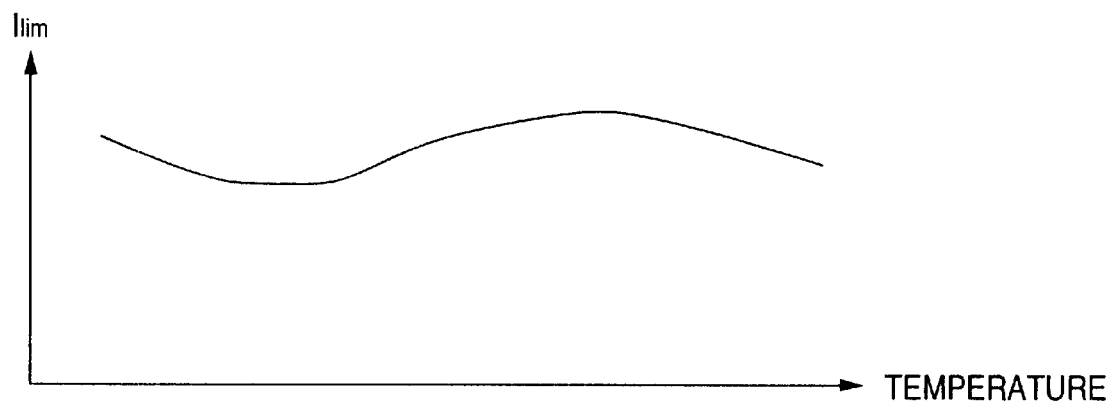
FIG. 6 is a graph schematically showing the temperature characteristic for current limit values, during current limitation while performing temperature compensation of a FET's ON-resistance.

FIG. 6 is a graph having the axis of abscissa representing temperatures ("Temp") and the ordinate axis representing current-limited values ("Ilim," the current values when the limitation of the current is performed). FIG. 6 illustrates change of the current limit value with respect to a change in temperature. As shown therein, the current value remains within a predetermined range regardless of the temperature Temp.

Although a thermistor is employed in this embodiment, any device having a negative temperature coefficient may be used to perform the temperature compensation of $R_{ON}$.

In the example of the circuit shown in FIG. 4, the cathode of the diode 43 is connected to the drain of the FET 44. The anode of the diode 43 is connected to terminal tm (where reference voltage "Vref" is supplied) through the resistor 45-1. The detected voltage is output through the resistors 45-2 and 45-3. An end of the resistor 45-3 is connected to the anode of the diode 43 through the resistor 45-2 and another end of the resistor 45-3 is connected to the source of the FET 44.

When the diode 43 is employed, the temperature compensation of the voltage "$V_{DS}$" between the drain and the source is performed by using the temperature characteristic of forward-directional voltage falling (VF) of the diode 43 as a substitute for a current detecting resistor configuration.

Figure 7:
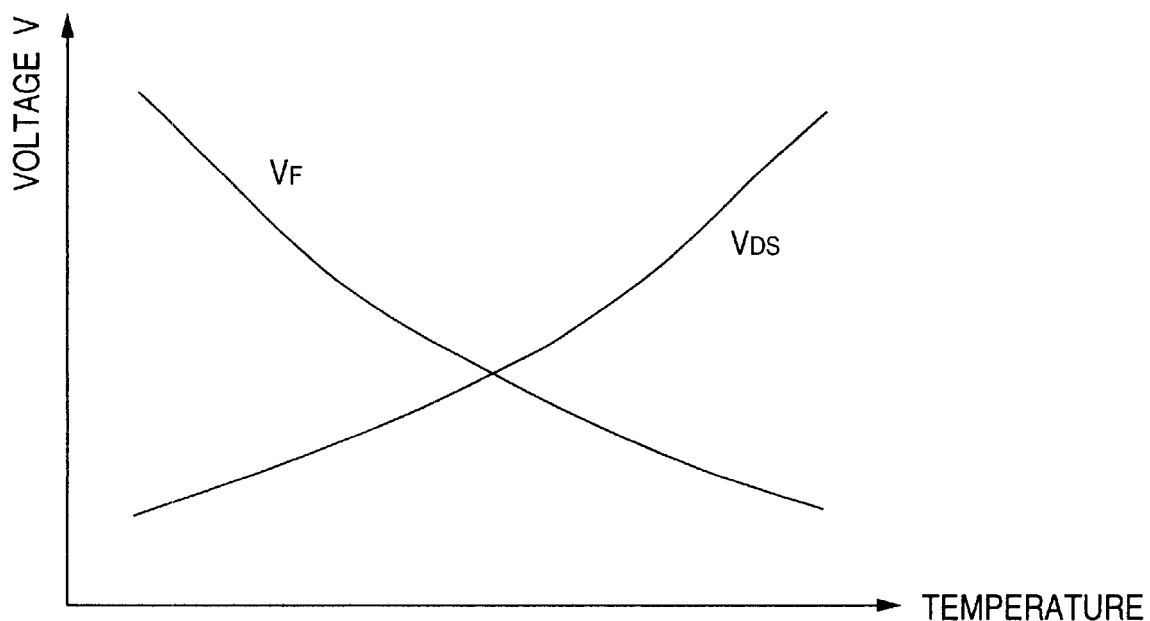
FIG. 7 is a graph schematically showing the temperature characteristic of the voltage between the drain and source of a FET compared with that for the forward-directional voltage drop of a diode.

FIG. 7 is a graph having the axis of abscissa representing temperature Temp and the ordinate axis representing voltage values ("V") to schematically shoe change in the value of $V_{DS}$ and change in the value of the forward-directional voltage falling (VF), each with respect to temperature change.

Regarding the temperature-characteristic of the values of $V_{DS}$, the value increases as the temperature Temp is raised. On the other hand, the voltage value of VF gradually decreases as the temperature Temp is raised. Therefore, an increase of the values of $V_{DS}$ caused from rise in temperature can be canceled by a corresponding decrease in voltage values VF of the diode.

Figure 8:
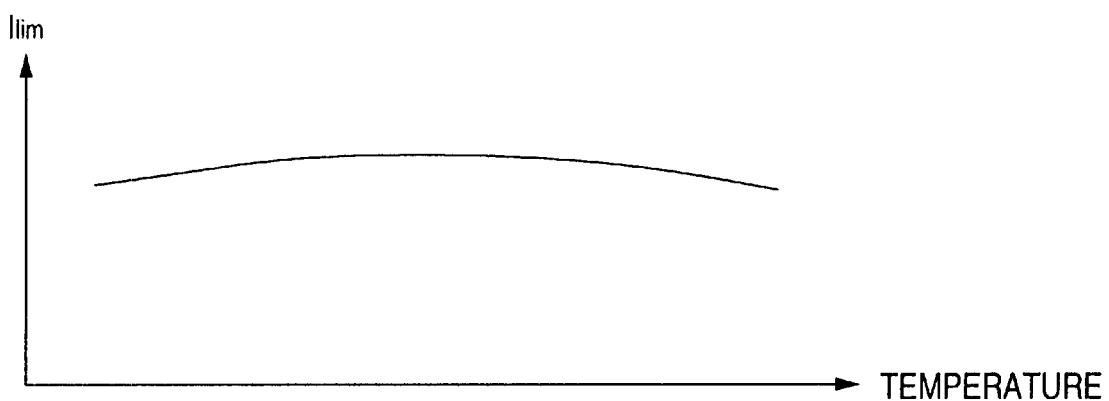
FIG. 8 is a graph schematically showing the temperature characteristic for current limit values, for a period of current limitation while performing temperature compensation of the voltage $V_{DS}$.

FIG. 8 is a graph having the axis of abscissa representing temperatures Temp and the ordinate axis representing current-limited values "Ilim," illustrating change in the current limit value with respect to temperature. As shown therein, the current values remain within a predetermined range regardless of the temperature Temp.

Since the present invention has a structure with a small number of devices (the resistor device and the temperature compensating device) and a small capacitance in a detecting portion, advantages can be realized in terms of the cost reduction and mounting on a substrate.

In addition, the following effects can also be obtained.

(i) The conventional current limiting method using a shunt resistance (current detecting resistor) cannot change the action or properties of the current limitation. The present invention allows for a change in current limiting action, other than being related to environmental temperature effects. The present invention has a value of the ON resistance $R_{ON}$ that increases as the temperature is raised. Therefore, even when a thermistor or diode are not used, the current limitation properties may be enhanced as the temperature is raised by, for example, adjusting the properties of the ON resistance $R_{ON}$ or adding a time constant circuit. Such a structure is advantageous from a viewpoint of protecting the circuit because a range of performance of current limitation may be adjusted in a direction that provides more protection against thermal rupture.

(ii) The voltage drop detected by the conventional shunt resistance directly causes electrical loss and wasteful heat consumption (Joules). In addition, this heat causes the temperature to be further raised in an environment in which the environmental temperature is already high (for example, the inside portion of the engine compartment of an automobile). Since the present structure allows a current of the FET to be detected by using the value of $V_{DS}$, additional electrical loss can be prevented. Thus, an effective countermeasure against heat can be realized.

The DC-AC converting circuit 4 shown in FIG. 1 is disposed at the output of the DC-DC converter 3 and may be formed into a full bridge circuit structure incorporating a plurality of pairs of switching devices (FET or the like).

The output voltage from the DC-AC converting portion 4 is supplied to the discharge lamp 7. When the discharge lamp 7 is turned on, high-voltage starting pulses (or turning-on pulses) must be superimposed on the output from the DC-AC converting portion 4 so as to be supplied to the discharge lamp. Therefore, the start circuit 5 is disposed between the DC-AC converting portion 4 and the discharge lamp 7. The discharge lamp 7 is connected to the output terminals 8 and 9 of the start circuit 5.

The control circuit 6 is provided to control the output voltage from the converter by controlling the ON/OFF operation of the FET constituting the DC-DC converter 3 In general, a PWM control method is employed. The control circuit 6 controls the ON/OFF operation of the FET in response to a detection signal from an output-voltage detecting portion 10, from an output current detecting portion 11 disposed between the DC-DC converter 3 and the DC-AC converting circuit 4, or a detection signal based on a tube voltage or a tube current from the start circuit 5. The control circuit 6 has a structure of a known control-signal generating circuit. For example, a control-signal generating circuit may incorporate a calculation amplifier or the like for generating a signal for supplying electric power excessively larger than rated electric power in an initial stage of the discharge, and for then gradually reducing the supplied electric power to shift to a constant electric power control, at the rated electric power, in accordance with the control curve of a characteristic graph of tube voltage and tube current of a discharge lamp (JP-A-4-141988).

The control signal S6 output from the control circuit 6 is transmitted to the gate of a FET 24, 34, 44, 54, 64. An example 12 of the structure of a farther embodiment of a circuit incorporates a FET 24 and is arranged to detect the electric current of the FET 24 (detection of $V_{DS}$) as shown in FIG. 9.

Figure 9:
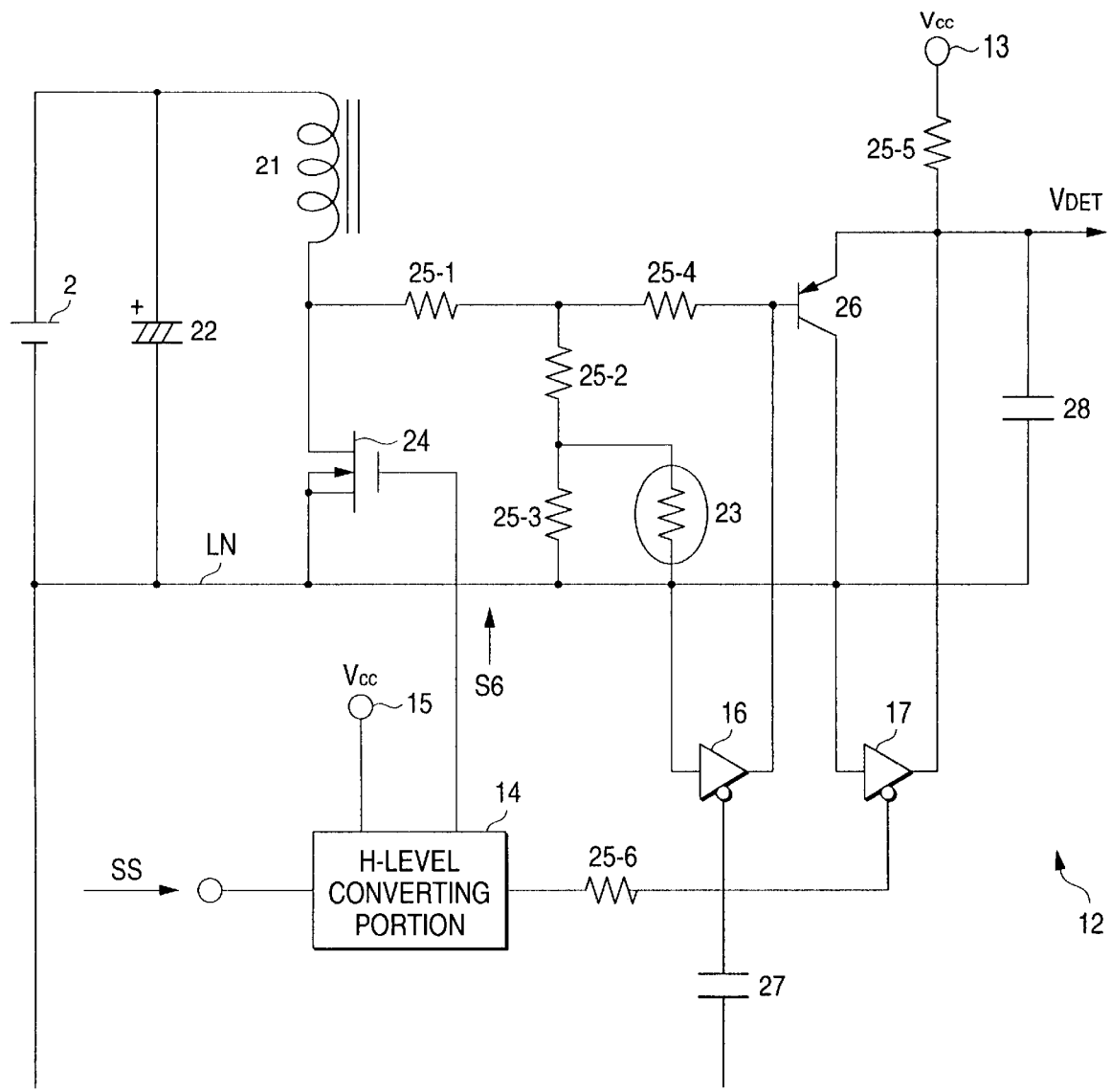
FIG. 9 is a circuit diagram showing an essential portion of the circuit of a preferred embodiment.

As shown in FIG. 9, a capacitor 22 is connected in parallel with the DC power source 2. A coil 21 and a FET 24 are connected in parallel with the capacitor 22.

That is, an end of the coil 21 is connected to the positive terminal of the DC power source 2 and another end of the coil 21 is connected to the drain of the FET 24. The source of the FET 24 is connected to the negative terminal of the DC power source 2. Note that the gate of the FET 24 is supplied with the control signal S6 transmitted from a H-level converting circuit 14 to be described later.

An end of the resistor 25-1 is connected to the drain of the FET 24, while another end of the resistor 25-1 is, through a resistor 25-4, connected to the base of the following pnp transistor 26. An end of the resistor 25-2 is connected in between the resistor 25-1 and the resistor 25-4. Another end of the resistor 25-2 is connected to the source of the FET 24 through the resistor 25-3.

The thermistor 23 is disposed in parallel with the resistor 25-3 to serve as a temperature compensation device as described above.

The pnp transistor 26 having the grounded collector has an emitter connected to the power-source terminal 13 (to which the voltage VCC is supplied) through the resistor 25-5. The output from the emitter of transistor 26 corresponds to the detected voltage. Note that the capacitor 28 is interposed between the emitter and the collector of the pnp transistor 26.

A control signal ("SS," a signal obtainable from a known control-signal generating circuit in a state where conversion to the H level is performed) for the FET 24 is supplied to the H-level converting circuit 14 so that the level of the signal SS Is converted. The value of the H level is made to be a predetermined voltage value (VCC). The H-level converting circuit 14 has a terminal 15 that is supplied with the voltage VCC for converting the voltage. The structure of the H-level converting circuit 14 is a known circuit structure (for example, a circuit for clipping the H level signal to the level VCC). The circuit makes the ON-operation of the FET 24 reliable. Generally, the supplied voltage VCC is higher than the power supply voltage for the control circuit 6.

The output signal S6 from the H-level converting circuit 14 is transmitted to the gate of the FET 24. A signal having the same phase as the S6 signal is transmitted to the enable terminals of the logic circuits 16 and 17 through the resistor 25-6 and the capacitor 27. The logic circuit 16 has an input terminal connected to the ground line LN so as to be L (Low) level. The output terminal of the logic circuit 16 is connected to the base of the pnp transistor 26. The enable terminal is made to be an active-low input. The input terminal of the logic circuit 17 is connected to the ground line LN, while the output terminal is connected to the emitter of the pnp transistor 26. The enable terminal is made to be an active-low input. When the level of the input signal to the enable terminal is L level, the logic circuits 16 and 17 permit transmission of the input signal thereto. When the level of the input signal to the enable terminal is H level, the logic circuits 16 and 17 are made to be high impedance (or opened state). The foregoing circuits may be 3-state buffers, transfer gates or analog switches. As the switching device for use in the foregoing structure, it is preferable that an FET is employed (if a bipolar transistor is employed, an influence corresponding to a saturated voltage $V_{CES}$ between the collector and the emitter can occur).

When the foregoing structure is arranged such that the capacitors 27 and 28 are omitted, the level of the output signals from the logic circuits 16 and 17 are made to be L level at the timing at which the FET 94, serving as the switching device, is switched off. Therefore, a transient voltage or spike voltage, which is not the detected voltage determined by the product of the ON-resistance of the FET and the drain current value, is ignored (that is, the voltage in the OFF-period of the FET is considered to be zero or substantially zero). Thus, the detection of the current can be realized by detecting the voltage $V_{DS}$ between the drain and the source of the FET. Although two logic circuits are employed in this embodiment, a structure having only one logic circuit may, of course, be employed.

When the capacitor 27 is provided, a time-constant circuit incorporating the resistor 25-6 and the capacitor 27 is constituted. As a result, time delay is caused in the circuit. Thus, time delay in switching caused from a mirror effect (an influence of the input/output capacitance of an amplifier) of the FET can be ignored. Therefore, a problem of the FET being forcibly turned off, caused from a determination that a large current is flowing at the instance at which the FET in the OFF state is turned on, can be prevented.

The necessity for the capacitor 28 will now be described. Although necessary in the circuit for generating the voltage VCC, it is preferable that the capacitor 28 is employed to prevent a problem where lowering of the voltage of the battery directly causes VCC to be lowered when VCC is generated from the main DC power source (the battery) by a series regulator circuit. That is, if the capacitor 28 is omitted, the voltage supplied to the gate of the FET is lowered because of lowering of the level of the voltage VCC. Therefore, the time delay of the FET caused from the mirror effect is undesirably lengthened. When the capacitor 28 is inserted between the collector and the emitter of the transistor 26, time is required to reach the actually detected voltage level in a case of lowering of the voltage VCC. Therefore, time delay caused from the mirror effect can be ignored. Therefore, the problem caused from the determination that a large electric current is flowing at the instance at which the FET has been turned on can be prevented.

Figure 10:
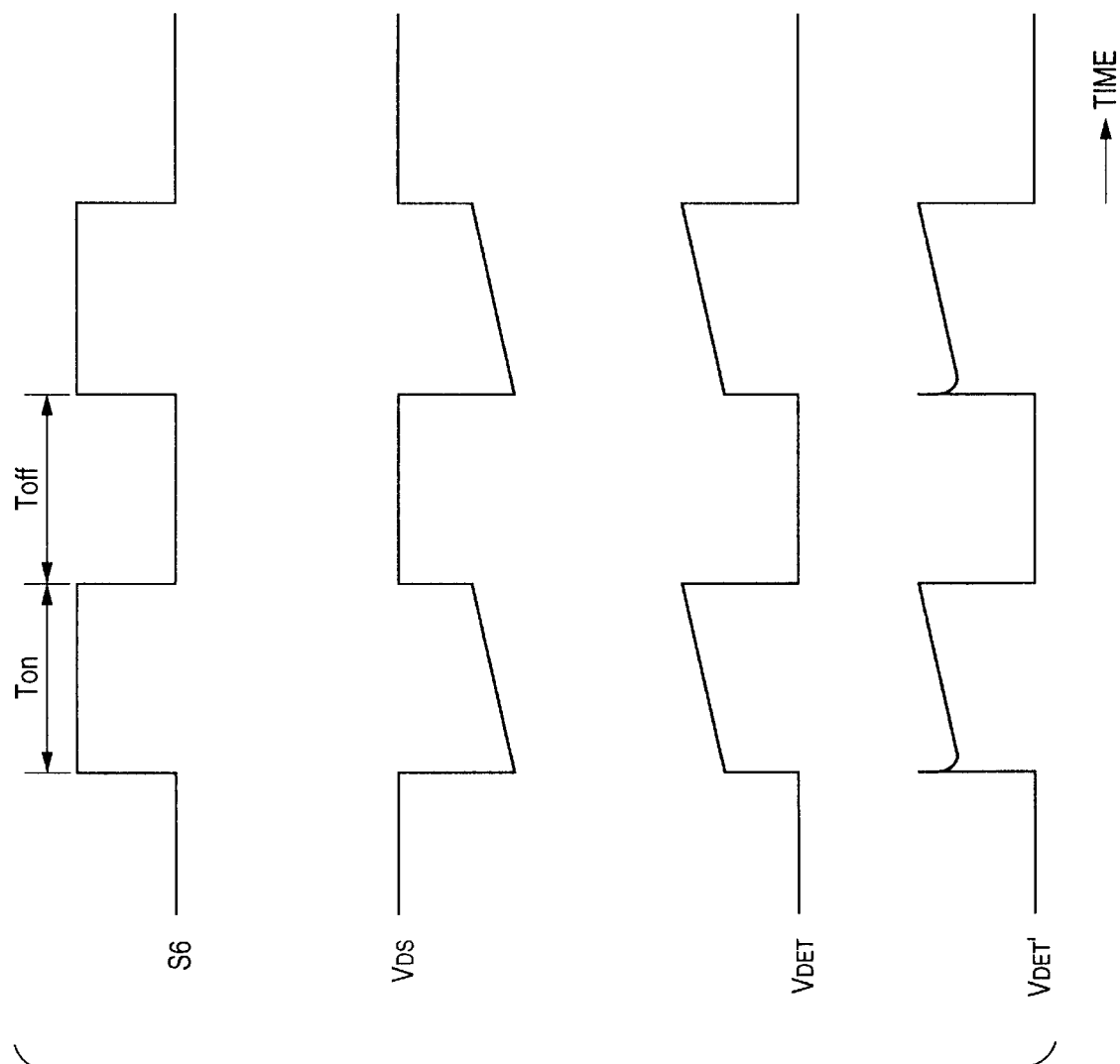
FIG. 10 is a graph schematically showing waveforms of portions in the circuit shown in FIG. 9.
Figure 11:
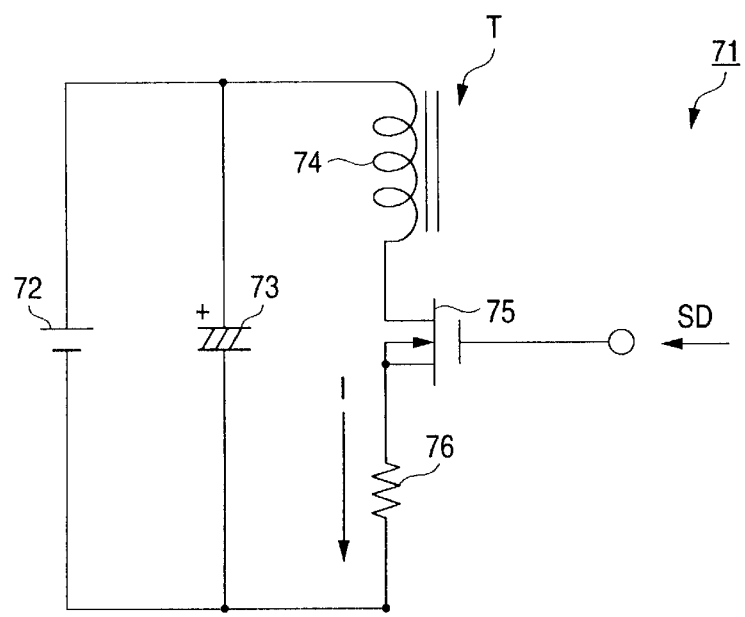
FIG. 11 is an example of an equivalent circuit diagram showing a conventional circuit structure.
Figure 12:
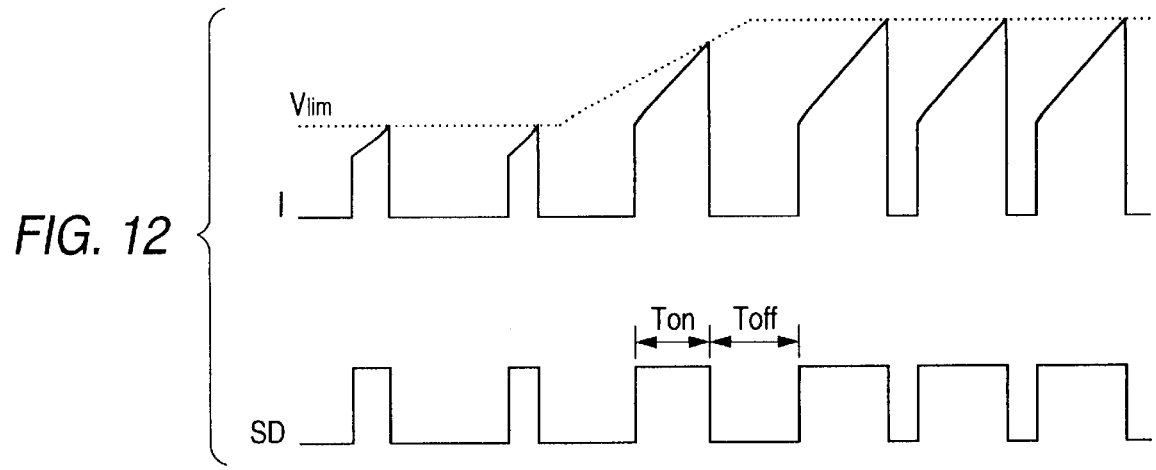
FIG. 12 is a graph showing waveforms for describing an operation of limiting the electric current of a field-effect transistor.

FIG. 10 shows waveform is of the control signal S6 to the FET 24, the voltage $V_{DS}$ between the drain and the source of the FET 24. and the detected voltage (expressed as "$V_{DET}$") after passage through the pnp transistor 26 and the capacitor 28. Referring to FIG. 10, "Ton" indicates ON-period of the FET 24 and "Toff" indicates OFF-period of the FET 24.

In the ON-period Ton of the FET 24, $V_{DS}$ is determined by the product of the ON resistance $R_{ON}$ and the drain current $I_D$. At the starting point of the ON-period Ton, voltage $V_{DS}$ between the drain and the source is lowest. Then, voltage $V_{DS}$ is gradually raised as the end of the period is made closer. In the OFF-period Toff of the FET 24, $V_{DS}$ is not determined by the relationship "$R_{ON} \cdot I_D$". That is, $V_{DS}$ is a voltage not lower than the voltage applied from the DC power source 2.

The detected voltage $V_{DET}$ is made to be high impedance (or opened state) when the H level signal is supplied to each of the enable terminals of the logic circuits 16 and 17 in the ON-period Ton of the FET 24. The voltage obtained by the resistors 25-1 and 25-4 and the thermistor 23 is then the detected voltage through the transistor 26 having the grounded collector. In the OFF-period Toff of the FET 24, the L level signal is supplied (active-low) to each of the enable terminals of the logic circuits 16 and 17 and the level of the output signal from each of the two circuits is made to be L level. As a result, $V_{DET}$ is lowered to zero volts or near zero volts.

As described above, it is preferable that the detected voltage between the drain and the source of the field effect transistor is lowered to zero or near zero when the transistor has been brought to the OFF-state (since no electric current flows when the FET 24 is in the OFF-state, the detected voltage level is made to be zero to obtain the detected voltage (the detected current value) only when the FET is in the ON-state). This is achieved by the logic circuits 16 and 17 for the structure shown in FIG. 9.

The detected voltage $V_{DS}$ between the drain and the source is not immediately raised at the moment of time when the FET in the OFF-state is turned on. It is preferable that the state in which the detected voltage between the drain and the source of the FET has been lowered to zero volt or near zero volt is suspended (or released) after the delay time has lapsed. The reason for this lies in that the influence of the mirror effect must be eliminated when the FET 24 is turned on/off. That is, when the FET 24 in the ON-state is shifted to the OFF-state (or shifted from the OFF-state to the ON-state), time delay occurs which is caused by the mirror effect. Therefore, the waveform of the detected voltage is made to be as shown by the voltage "$V_{DET}$" in FIG. 10. Thus, a whisker-like voltage (the leading voltage) is generated at the front end of the ON-period Ton. However, a problem of an incorrect determination of an excess current being made (where the FET is immediately turned off) is a concern because of this whisker-like voltage.

To prevent this problem, the structure shown in FIG. 9 is arranged such that the capacitor 27 is provided to correspond to the enable input to the logic circuits 16 and 17. The time constant determined by the electrostatic capacitance of the capacitor 27 and the resistance value of the front resistor 25-6 is used to determine the previously-mentioned delay time. That is, when the FET 24 in the OFF-state is shifted to the ON-state, the H level signal is input to each of the enable terminals of the logic circuits 16 and 17 after the delay time has elapsed. Therefore, the whisker-like voltage period can be ignored. Thus, the possibility of a false determination (the whisker-like voltage being considered as the correctly detected voltage) can be prevented.

The influence of the mirror effect becomes conspicuous when the voltage supplied to the gate of the FET 24 has been lowered (because the delay time in the switching of the FET 24 becomes elongated). Therefore, it is preferable that the length of the delay time is elongated as the gate voltage of the FET is lowered. That is, for the structure shown in FIG. 9, raising of the detected voltage is delayed by providing the capacitor 28. Since the charge current is small when the value of the VCC is low, the capacitor 28 has a function to delay the rise of the detected voltage $V_{DET}$. Therefore, if the time delay in the change of switching is elongated because of the influence of the mirror effect on the FET 24, delay of the charging operation of the capacitor 28 is able to cancel the elongation. Thus, generation of the whisker-like voltage can be prevented.

As described above, the detection signal corresponding to the electric current which flows in the field effect transistor is obtained from the voltage between the drain and the source of the transistor. When the voltage level is made to be the reference value or higher, the field effect transistor is turned off. Thus, rupture of the device owing to overcurrent can be prevented. Since a current detecting resistor or the like having a large capacitance is not required, reduction in the size and cost of the apparatus is achieved. Moreover, an effective countermeasure against heat can also be achieved.

The structure with a temperature compensation device for compensating the temperature characteristic of the ON-resistance of the field effect transistor is provided. Therefore, the value of the limited current can be made to be constant regardless of the temperature.

When the field effect transistor is in the OFF-state, the detected voltage level can be made to be zero or near zero. Thus, flow of an electric current is inhibited in the OFF-period of the transistor so that a problem caused from incorrect detection of an electric current is prevented.

Elimination of the influence of an ambiguous state of the device caused from the mirror effect of the field effect transistor when switching is also achieved. Therefore, an incorrect determination (a determination is undesirably made that a large electric current is flowing in the transistor because of transient high voltage generated immediately after the transistor has been turned on) about the detected voltage between the drain and the source can be prevented.

The length of a delay time, concerning the detected voltage between the drain and source, is elongated as the gate voltage of the field effect transistor is lowered. Thus, if the time delay (caused from the mirror effect) of the transistor is elongated when the supplied voltage has been lowered, the delay time can be made to be reliable to ignore the previous period. Since the delay time is elongated as the period of the time delay is elongated, an error in determination about the detected voltage concerning the voltage between the drain and the source can be prevented.

What is claimed is:

1. A lighting circuit for a discharge lamp, comprising:

a DC-DC converter for converting a DC input voltage supplied from a DC power source, said converter having a switching device and producing an output voltage; and, a control circuit for controlling output voltage from said converter by controlling ON/OFF of a field effect transistor serving as said switching device, wherein an electric current which flows in said field effect transistor is monitored by detecting voltage between a drain and a source of said field effect transistor, and wherein said control circuit turns said field effect transistor off when a value of said voltage is not smaller than a reference value;

wherein one of said source and drain is electrically connected directly to the DC power source.

2. A lighting circuit for a discharge lamp, comprising:

a DC-DC converter for converting said DC input voltage, said converter having a switching device and producing an output voltage; and, a control circuit for controlling output voltage from said converter by controlling ON/OFF of a field effect transistor serving as said switching device, wherein an electric current which flows in said field effect transistor is monitored by detecting voltage between a drain and a source of said field effect transistor, and wherein said control circuit turns said field effect transistor off when a value of said voltage is not smaller than a reference value, and further comprising:

a temperature compensation device for eliminating an influence of a change in temperature on the voltage between said drain and said source of said field effect transistor.

3. A lighting circuit for a discharge lamp according to claim 1, wherein when said field effect transistor has been turned off, the detected voltage between said drain and said source of said field effect transistor is lowered to, or near to, zero volts.

4. A lighting circuit for a discharge lamp according to claim 2, wherein when said field effect transistor has been turned off, the detected voltage between said drain and said source of said field effect transistor is lowered to, or near to, zero volts.

5. A lighting circuit for a discharge lamp according to claim 3, wherein in a state, where the detected voltage between said drain and said source of said field effect transistor has been lowered to zero or near zero, is suspended after a delay time that starts from a moment of time at which said field effect transistor is changed from OFF-state to ON-state.

6. A lighting circuit for a discharge lamp according to claim 4, wherein a length of the delay time, delaying a raising of the detected voltage between said drain and said source, is increased as the gate voltage of said field effect transistor is lowered.

7. A lighting circuit as claimed in claim 2, wherein said temperature compensation device comprises a thermistor.

8. A lighting circuit as claimed in claim 2, wherein said temperature compensation device comprises a diode.

* * * * *